(12) United States Patent
Kurose

(10) Patent No.: US 6,893,723 B2
(45) Date of Patent: May 17, 2005

(54) MAGNETIC RECORDING MEDIUM

(75) Inventor: Shigeo Kurose, Tokyo (JP)

(73) Assignee: TDK Corporation, Tokyo (JP)

( * ) Notice: Subject to any disclaimer, the term of this patent is extended or adjusted under 35 U.S.C. 154(b) by 104 days.

(21) Appl. No.: 10/630,849

(22) Filed: Jul. 31, 2003

(65) Prior Publication Data

US 2004/0072026 A1 Apr. 15, 2004

(30) Foreign Application Priority Data

Jul. 31, 2002 (JP) ........................................ 2002-223850

(51) Int. Cl.$^7$ .............................................. G11B 5/702
(52) U.S. Cl. ............................. 428/423.1; 428/694 BS; 428/694 BU; 428/694 BG; 428/694 BC
(58) Field of Search ..................... 428/694 BS, 694 BU, 428/694 BG, 694 BC, 423.1

(56) References Cited

U.S. PATENT DOCUMENTS 5,922,824 A  *  7/1999  Amirsakis ..................... 528/71

FOREIGN PATENT DOCUMENTS

| JP | 58-146024 | | 8/1983 |
| JP | 59 172121 | * | 9/1984 |
| JP | 63-253526 | | 10/1988 |
| JP | 2001-84569 | | 3/2001 |
| JP | 2001-84570 | | 3/2001 |

* cited by examiner

Primary Examiner—Stevan A. Resan
(74) Attorney, Agent, or Firm—Oblon, Spivak, McClelland, Maier & Neustadt, P.C.

(57) ABSTRACT

A high density magnetic recording medium having improved dispersibility in a non-magnetic layer, excellent surface properties, electromagnetic conversion properties and durability is provided. The magnetic recording medium comprises a non-magnetic substrate, a non-magnetic layer disposed on the non-magnetic substrate, and a magnetic layer disposed on the non-magnetic substrate via the non-magnetic layer containing at least carbon black and a radiation curing type binder, wherein the radiation curing type binder contains a radiation curing type polyurethane resin having both a basic polar group and a sulfur-containing polar group in a molecule. The basic polar group is preferably an amino group, and the sulfur-containing polar group is preferably a sulfonic metal basic group.

5 Claims, No Drawings

MAGNETIC RECORDING MEDIUM

BACKGROUND OF THE INVENTION

1. Field of the Invention

The present invention relates to a high density magnetic recording medium. More particularly, the present invention relates to a magnetic recording medium having a thin magnetic film.

2. Description of the Related Art

In recent years, magnetic recording media have been digitized in order to avoid signal deterioration by many times of copies. The magnetic recording media have also been needed to have a high density, since they have to record a large quantity of data. Fine metal magnetic powders having high saturated magnetic flux density and hexagonal tabular-shaped barium ferrite magnetic powders have been practically used.

On the other hand, for providing a high density, it is necessary to consider thickness loss and self-demagnetization of the medium. In view of the above, the magnetic layer is to be thin. However, if the magnetic layer is thinned, surface properties of a substrate may unfavorably affect a surface of the magnetic layer, which may deteriorate electro-magnetic conversion properties. It has been conventionally proposed that a non-magnetic layer comprising a thermosetting resin is disposed on the surface of the substrate, and a magnetic layer is disposed on the substrate via the non-magnetic layer. Hitherto, in order to improve the durability of the non-magnetic layer, a number of thermosetting resin binders have been proposed. Recently, some radiation curing type binders are proposed and used to provide a stronger coating film.

Japanese Examined Patent Application Publication Nos. 6-52566 and 1-30221 describe that a radiation curing type binder is used for a non-magnetic coating agent. However, it is difficult to produce a coating agent for a non-magnetic layer having good dispersibility using such a radiation curing type binder disclosed in the publications in order to increase a coating strength. As a result, electromagnetic conversion properties of the magnetic recording medium tend to be deteriorated.

Japanese Unexamined Patent Application Publication Nos. 2001-84569 and 2001-84570 both filed by the present applicant describe that a polyurethane resin having a polar group is used as a radiation curing type binder for a non-magnetic under layer. Specifically, the former publication discloses that the nonmagnetic layer contains as a pigment at least acid carbon black that has a pH of less than 6, and also contains the radiation curing type binder including a polyur thane resin having at least a basic polar group. The latter publication discloses that the nonmagnetic layer contains as a pigment at least carbon black, and also contains the radiation curing type binder including a polyurethane resin having at least a basic polar group.

In the prior art proposed by the present applicant, the non-magnetic layer containing carbon black has improved strength, electromagnetic conversion properties and durability. However, a magnetic recording medium with a higher density and a thinner magnetic layer having a thickness of less than 0.30 μm is required at present. Accordingly, the prior art non-magnetic layer has insufficient dispersibility in the case of such a magnetic recording medium.

SUMMARY OF THE INVENTION

Accordingly, it is an object of the present invention to provide a high density magnetic recording medium having excellent surface properties, electro-magnetic conversion properties, and durability and including a non-magnetic layer having higher dispersibility.

Through intense studies by the present inventors, it is found that the object is achieved by using a radiation curing type polyurethane resin having both a basic polar group and a sulfur-containing polar group in a molecule in a non-magnetic layer containing carbon black.

One aspect of the present invention is a magnetic recording medium, comprising a non-magnetic substrate, a non-magnetic layer disposed on the non-magnetic substrate, and a magnetic layer disposed on the non-magnetic substrate via the non-magnetic layer containing at least carbon black and a radiation curing type binder, wherein the radiation curing type binder contains a radiation curing type polyurethane resin having both a basic polar group and a sulfur-containing polar group in a molecule.

In the magnetic recording medium, the basic polar group is preferably an amino group, and the sulfur-containing polar group is preferably a sulfonic metal basic group.

In the magnetic recording medium, the radiation curing type polyurethane resin preferably has a glass transition temperature of −20° C. to 80° C. Further, the radiation curing type polyurethane resin preferably has a number average molecular weight of 5000 to 100000.

DESCRIPTION OF THE PREFERRED EMBODIMENTS

The following examples are provided to illustrate presently contemplated preferred embodiments, but are not intended to be limiting there.

The radiation curing type polyurethane in the binder for use in the non-magnetic layer according to the present invention contains both a basic polar group and a sulfur-containing polar group in a molecule. Preferable basic polar group is a salt including a dialkylamino group or a trialkyl ammonium group. It is considered that the binder is intimately adsorbed to carbon black by binding the basic polar group to polyurethane, resulting in good dispersibility.

Preferable sulfur containing group is $-SO_4Y$ or $-SO_3Y$ (where Y is a hydrogen atom or an alkali metal). It is considered that the sulfur containing polar group favorably affects non-magnetic powder, especially a non-magnetic iron oxide, resulting in more improved dispersibility.

The polar group Is preferably contained in amount of 0.01 to 0.6 mmol/g of the polar group, more preferably 0.1 to 0.5 mmol/g In the molecule. If the polar group is contained in amount of less than 0.01 mmol/g, the dispersibility is not sufficiently improved. If the polar group is contained in amount of exceeding 0.6 mmol/g, the solubility of the binder is undesirably decreased. The polar group may be bonded to a main chain, or a branched chain of a backbone polyurethane resin. The polar group can be introduced into the resin by any known method.

According to the present invention, the basic-polar group is bonded to a resin backbone of the radiation curing type polyurethane resin. Specifically, the radiation curing type polyurethane resin is a polyurethane acrylate resin where polyurethane resin having urethane bonds and acrylic compounds having at least one acrylic double bond in the molecule are bonded each other.

As utilized herein, the term "acrylic double bond" refers to a residue (acryloyl group, or methacryloyl group) of acrylic acid, acrylic acid ester, acrylic acid amide, methacrylic acid, methacrylic acid ester, methacrylic acid amide and the like. Examples of the acrylic compound having the double bond include a mono(meth)acrylate of a glycol such as ethylene glycol, diethylene glycol and hexamethylene glycol; a mono(meth)acrylate or a di(meth)acrylate of a triol compound such as trimethylolpropane, glycerin and trimethylolethane; a mono(meth)acrylate, a di(meth)acrylate, or tri(meth)acrylate of a quadravalent or more polyol such as pentaerythritol and dipentaerythritol; and an acrylic compound having a hydroxyl group such as glycerin monoallylether and glycerin diallylether. The binder should include at least one acrylic double bond, and preferably 2 to 20 acrylic double bonds in the molecule.

The polyurethane acrylate resin for use in the present invention is typically prepared by reacting together a hydroxyl group-containing resin, a hydroxyl group-containing acrylic based compound, a polyisocyanate-containing compound, and two types of compounds having the above-mentioned based polar group and sulfur-containing polar group. Examples of the hydroxyl group-containing resin include a polyalkylene glycol such as polyethylene glycol, polybutylene glycol and polypropylene glycol; an alkylene oxide adduct of bisphenol A; various glycols; and polyester polyol having a hydroxyl group at an end group in a molecule chain. Of these, polyurethane acrylate resin produced using polyester polyol as one component is preferable.

Examples of a carboxylic acid component of the polyester polyol include an aromatic dicarboxylic acid such as terephthalic acid, isophthalic acid, orthophthalic acid and 1,5-naphthalic acid; aromatic oxycarboxylic acid such as p-oxybenzoic acid, p-(hydroxyethoxy)benzoic acid; an aliphatic dicarboxylic acid such as succinic acid, adipic acid, azelaic acid, sebacic acid and dodecane dicarboxylic acid; an unsaturated fatty acid and an acyclic dicarboxylic acid such as fumaric acid, maleic acid, itaconic acid, tetrahydrophtalic acid and hexahydrophtalic acid and a tri- or tetra-carboxylic acid such as trimellitic acid, trimesic acid and pyromellitic acid.

Examples of the glycol contained in the polyester polyol include ethylene glycol, propylene glycol, 1,3-propane diol, 1,4-butane diol, 1,5-pentane diol, 1,6-hexane diol, neopenthyl glycol, diethylene glycol, dipropylene glycol, 2,2,4-trimethyl-1,3-pentane diol, 1,4-cyclohexane dimethanol, an ethylene oxide adduct or a propyl ne oxide adduct of bisphenol A or of hydrogenated bisphenol A, polyethylene glycol, polypropylene glycol, polytetramethylene glycol and the like. A triol or a tetraol such as trimethylol ethane, trimethylol propane, glycerin and pentaerythritol may be used in combination therewith. An example of polyester polyol includes a lactone-based polyester diol prepared by ring-opening polymerization of lactones such as caprolactone.

Examples of polyisocyanate include a diisocyanate compound such as 2,4-tolylenediisocyanate, 2,6-tolylenediisocyanate, p-phenylenediisocyanate, biphenylmethanediisocyanate, m-phenylenediisocyanate, hexamethylenediisocyanate, tetramethylenediisocyanate, 3,3'-dimethoxy-4,41-biphenylenediisocyanate, 2,4-naphthalene diisocyanate, 3,3'-dimethyl-4,4'-biphenylenediisocyanate, 4,4'-diphenylenediisocyanate, 4,4'-diisocyanate-diphenyl ether, 1,5-naphthalenediisocyanate, p-xylylenediisocyanate, m-xylylenediisocyanate, 1,3-diisocyanatemethylcyclohexane, 1,4-diisocyanate methyl cyclohexane, 4,4'-diisocyanatedicyclohexane, 4,4'-diisocyanatecyclohexylmethane, and isophoronediisocyanate; and a triisocyanate compound such as a trimer of 2,4-tolylenediisocyanate, and a trimer of hexamethylenediisocyanate that constitute 7 mol % or less of all isocyanate groups.

The resultant polyurethane acrylate resin has preferably a number average molecular weight of 5000 to 100000. If the molecular weight is less than 5000, running durability at high temperature is adversely affected. If the molecular weight exceeds 100000, dispersibility of a coating paste is decreased to adversely affect surface properties. The polyurethane acrylate resin has preferably a glass transition temperature (Tg) of −20° C. to 80° C. If Tg is less than −20° C. running durability at high temperature is adversely affected. If Tg exceeds 80° C., running durability at low temperature is adversely affected, calendering properties are decreased to deteriorate surface roughness of the magnetic layer, and electromagnetic conversion properties may be deteriorated.

Other resins may be used in combination with the above-mentioned polyurethane acrylate resin in the radiation curing type binder according to the present invention. Examples of the resin used in combination Include a (meth)acrylic resin, a polyester resin, a vinyl chloride copolymer, an acrylonitril—butadiene copolymer, a polyamide resin, a polyvinyl butyral, nitrocellulose, a styrene—butadiene copolymer, a polyvinyl alcohol resin, an acetal resin, an epoxy resin, a phenoxy resin, a polyether resin, a multifunctional polyethers such as polycaprolactone, a polyamide resin, a polyimide resin, a phenol resin, and a resin obtained by modifying a polybutadiene elastomer to be a radiation curing type. Of these, a vinyl chloride copolymer is preferable.

The above-mentioned resin is modified to be the radiation curing type using the following three typical methods (1) to (3): (1) a resin having a hydroxyl group or a carboxylic acid group is reacted with a compound including a (meth)acrylic group, carboxylic anhydride or dicarboxylic acid to be modified, (2) a reaction product (a adduct) of tolylenediisocyanate and 2-hydroxyethylmethacrylate is reacted to be modified, and (3) a monomer having one or more ethylenic unsaturated double bond, one isocyanate group and no urethane bond in a molecule is reacted to be modified. The resin provided by the method (3) is excellent in that modification is easily performed and dispersibility and properties after modification are excellent. Examples of the monomer include 2-isocyanate ethyl(meth)acrylate. The monomer includes preferably 1 to 20, more preferably 2 to 15 acrylic groups or methacrylic groups in a molecule.

A radiation curing type monomer or oligomer may be used to increase a cross-linking degree of a coating film, as needed.

It is preferable that the radiation curing type binder according to the present invention include an epoxy group for increasing thermal stability.

Examples of radiation used in the present invention include electron beams, γ rays, β rays and ultraviolet rays. Electron beams are preferable. A dose is preferably 1 to 10 Mrad, more preferably 3 to 7 Mrad. Irradiated energy (accelerating voltage) is preferably 100 kV or more. The radiation is desirably irradiated after coating and drying and before winding, but may be irradiated after coating, drying and winding.

The non-magnetic layer should contain at least carbon black. Carbon black has functions to decrease surface electrical resistance of the magnetic layer, to hold the lubricant in the coating film, to provide the magnetic layer with the lubricant, and to bury spaces between protrusions on a base substrate, thereby improving surface properties of the magnetic layer.

Other non-magnetic powder can further be used in addition to carbon black, and includes but is not limited to $\alpha$-$Fe_2O_3$, $Al_2O_3$, $Cr_2O_3$, $SiO_2$, ZnO, $TiO_2$, $ZrO_2$ and $Sno_2$. Of these, needle-like $\alpha$-$Fe_2O_3$ having an average major axis length of 200 nm or less or needle-like $\alpha$-$Fe_2O_3$ having a size of 20 nm to 100 nm is used to be capable of relax thixotropy of a coating agent including only carbon black, and to harden the coating film. In addition, $\alpha$-$Fe_2O_3$ or $Cr_2O_3$ having an average particle size of 0.1 to 1.0 $\mu$m is used to increase strength of the non-magnetic layer. Carbon black can be present in amount of 5% to 100% by parts, preferably 10% to 100% by weight. If the content of carbon black is less than 5% by weight, the lubricant added has decreased holding power, and the durability becomes poor. In addition, the magnetic layer may have Increased surface electrical resistance, and high light transmittance. Any carbon black can be used, but carbon black having an average particle size of 10 nm to 80 nm is preferable. Examples of carbon black include furnace carbon black, thermal carbon black and acetylene black. Carbon black may be used alone or In combination.

Carbon black preferably has a BET specific surface area of 50 to 500 $m^2/g$, more preferably 60 to 250 $m^2/g$. As to specific examples of carbon black used in the present invention, for example, see "carbon black handbooks" edited by Carbon Black Association.

Preferably, the non-magnetic under layer according to the present invention contains a lubricant in addition to the above-mentioned materials. Examples of the lubricant include any known lubricant such as higher fatty acids, higher fatty acid esters, paraffins and fatty acid amides.

It is preferable that metal alloy fine powder or tabular hexagonal ferrite powder be used as the ferromagnetic powder for use in the present invention. The metal alloy fine powder preferably has coercive force Hc of 119.4 to 238.7 kA/m (1500 to 3000 Oe), saturated magnetization as of 110 to 160 $Am^2/kg$ (110 to 160 emu/g), average major axis length of 0.03 to 0.15 $\mu$m, average minor axis length of 10 nm to 20 nm, and an aspect ratio of 1.2 to 20. The resultant magnetic recording medium preferably has Hc of 119.4 to 238.7 kA/m (1500 to 3000 Oe). Depending on the intended usage, elements such as Ni, Zn, Co, Al. Si, Y and other rare earths may be added. The tabular hexagonal ferrite powder preferably has Hc of 79.6 to 302.4 kA/m (1000 to 3800 Oe), as of 50 to 70 $Am^2/kg$ (50 to 70 emu/g), average tabular-shaped powder size of 20 nm to 80 nm, and a tabular-shape ratio of 2 to 7. The resultant magnetic recording medium preferably has Hc of 95.5 to 318.3 kA/m (1200 to 4000 Oe). Depending on the intended usage, elements such as Ni, Co, Ti, Zn, Sn and other rare earths can be used in a non-limiting way. Non-limiting known materials can be used depending on the intended use.

In the present invention, a back coat layer is preferably provided in addition to the non-magnetic layer and the magnetic layer. Examples of the binder used in the magnetic layer and the back coat layer include a thermoplastic resin, a thermosetting or reaction type resin, an electron sensitive modified resin and the like. Any combination may be possible depending on properties of the medium, and process conditions. When the radiation curing type polyurethane resin according to the present invention is used in the back coat layer, properties thereof can be improved. As needed, a dispersant such as a surfactant; a lubricant such as a higher fatty acid, a fatty acid ester, and silicone oil; and other additives may be added to the magnetic layer and the back coat layer.

According to the present invention, the non-magnetic layer is coated on the non-magnetic substrate, and the magnetic layer is coated on the non-magnetic layer. The non-magnetic layer preferably has a thickness of 0.5 to 3.0 $\mu$m, more preferably 1.0 to 3.0 $\mu$m. If the thickness is less than 0.5 $\mu$m, surface properties of the base substrate tond to adversely affect surface properties of the magnetic recording medium, resulting in poor electromagnetic conversion properties. Also, if the thin non-magnetic layer is too thin, the amount of the lubricant is correspondingly decreased to deteriorate the durability. If the thickness exceeds 3.0 $\mu$m, the resultant properties may not be deteriorated, but no special advantages are provided.

The magnetic layer has a thickness of 0.30 $\mu$m or less in view of high density recording, preferably 0.05 to 0.30 $\mu$m, and more preferably 0.50 to 0.25 $\mu$m. If the magnetic layer is too thick, self-demagnetization loss or thickness loss may be undesirably increased.

The back coat layer, if provided, has a thickness (after calendering) of 1.0 $\mu$m or less, preferably 0.1 to 1.0 $\mu$m, and more preferably 0.2 to 0.8 $\mu$m. If the back coat layer is too thick, friction with a sliding and contacting portion of the magnetic recording medium becomes too high to decrease the running stability. On the other hand, if the back coat layer is too thin, the surface properties of the non-magnetic substrate may decrease the surface properties of the back coat layer. In other words, surface roughness of the back coat layer affects the surface properties of the magnetic layer, such that a decrease in high frequency output, S/N or C/N may be induced, and the back coat layer tend to be deformed when the medium is operated.

The magnetic layer, the non-magnetic layer, and the back coat layer, as needed, are provided on the non-magnetic substrate. Examples of a material for use in the non-magnetic substrate are but are not limited to various flexible materials including a polyester resin such as polyethylene terephthalate and polyethylene naphthalate; and a polyamide resin depending on the intended purpose, and they can have the predetermined tape shape and the size in accordance with various standard.

The non-magnetic layer and the magnetic layer may be coated on the non-magnetic substrate by a wet-on-wet coating method that the magnetic layer is coated while the non-magnetic layer is still wet, or by a wet-on-dry coating method that the non-magnetic layer is coated and dried, and the magnetic layer is then coated. In view of the improvement of the recording density, the magnetic layer is preferably coated after the non-magnetic layer is cured by the wet-on-dry coating, in order to control the surface properties of the both layers at high degree.

EXAMPLES

The present invention will be Illustrated based on the following examples.
<A Synthesis Example of Electron Beam Curing Type Polyurethane Resin (Polyurethane Acrylate Resin)>
Synthesis of Electron Beam Curing Type Polyurethane Acrylate Used in Comparative Example 1

Dimethyl terephthalate, dimethyl isophthalate, ethylene glycol, neopentyl glycol and tetrabutoxy titanate were introduced into an autoclave equipped with a thermometer an agitator and a partial reflux condenser, heated at 150 to 230° C. for 120 minutes to be transesterificated, and further reacted at 220 to 230° C. for 1 hour. Then, the reaction system was heated to 250° C. for 30 minutes, and the pressure in the system was gradually decreased to 10 mmHg (1333 Pa) after 45 minutes. The reaction was continued for 60 minutes under the conditions. The resultant polyester diol (A1) had a molar ratio of terephthalic acid/isoptalic acid/thylene glycol/neopentyl glycol=50/50/50/50.

By repeating the similar procedure, polyester diol (A2) having a molar ratio of adipic acid/1,4-butanediol/neopentyl glycol=100/75/25 was provided.

Toluene, methylethylketone (MEK), the polyester diol (A1), the polyester diol (A2), 4,4'-diphenylmethanediisocyanate and dibutyl tin laurate were introduced into a reaction vessel equipped with a thermometer, an agitator and a reflux condenser, reacted at 70 to 80° C. for 3 hours. Then, pentaerythritol acrylate was added and reacted at 70 to 80° C. for 2 hours to provide a polyurethane acrylate resin solution having a solid content of 40% by weight. The solvent was evaporated from the reacted liquid to provide the polyurethane acrylate resin shown in Table 1.

In Table 1, the number average molecular weight was determined by measuring a standard polystyrene conversion value with gel permeation chromatography using tetrahydrofuran (THF) as a solvent.

Synthesis of Electron Beam Curing Type Polyurethane Acrylate Used in Comparative Example 2

Dimethyl terephthalate, dimethyl isophthalate, 5-dimethyl sodium sulfoisophthalate, ethylene glycol, neopentyl glycol and tetrabutoxy titanate were introduced into an autoclave equipped with a thermometer, an agitator and a partial reflux condenser, heated at 150 to 230° C. for 120 minutes to be transesterificated, and further reacted at 220 to 230° C. for 1 hour. Then, the reaction system was heated to 250° C. for 30 minutes, and the pressure in the system was gradually decreased to 10 mmHg (1333 Pa) after 45 minutes. The reaction was continued for 60 minutes under the conditions. The resultant polyester diol (B1) had a molar ratio of terephthalic acid/isophtalic acid/5-sodium sulfoisophthalate/ethylene glycol/neopentyl glycol=49/49/2/50/50.

By repeating the similar procedure, polyester diol (B2) having a molar ratio of adipic acid/1,4-butanediol/neopentyl glycol=100/75/25 was provided.

Toluene, methylethylketone, the polyester diol (B1), the polyester diol (B2), 4,4'-diphenylmethanediisocyanate, and dibutyl tin laurate were introduced into a reaction vessel equipped with a thermometer, an agitator and a reflux condenser, reacted at 70 to 80° C. for 3 hours. Then, pentaerythritol acrylate was added and reacted at 70 to 80° C. for 2 hours to provide a polyurethane acrylate resin solution having a solid content of 40% by weight. The solvent was evaporated from the reacted liquid to provide the polyurethane acrylate resin shown in Table 1.

Synthesis of Electron Beam Curing Type Polyurethane Acrylate Used in Comparative Example 3

Dimethyl terephthalate, dimethyl isophthalate, ethyl ne glycol, neopentyl glycol and tetrabutoxy titanate were introduced into an autoclave equipped with a thermometer, an agitator and a partial reflux condenser, heated at 150 to 230° C. for 120 minutes to be transesterificated, and further reacted at 220 to 230° C. for 1 hour. Then, the reaction system was heated to 250° C. for 30 minutes, and the pressure in the system was gradually decreased to 10 mmHg (1333 Pa) after 45 minutes. The reaction was continued for 60 minutes under the conditions. The resultant polyester diol (C1) had a molar ratio of terephthalic acid/isophtalic acid/ethylene glycol/neopentyl glycol=50/50/50/50.

By repeating the similar procedure, polyester diol (C2) having a molar ratio of adipic acid/1,4-butanediol/neopentyl glycol=100/75/25 was provided.

Toluene, methylethylketone, the polyester diol (C1), the polyester diol (C2), 4,4'-diphenylmethanediisocyanate, 3-diethylamino-1,2-propane diol and dibutyl tin laurate were introduced into a reaction vessel equipped with a thermometer, an agitator and a reflux condenser, reacted at 70 to 80° C. for 3 hours. Then, pentaerythritol triacrylate was added and reacted at 70 to B0° C. for 2 hours to provide a polyurethane acrylate resin solution having a solid content of 40% by weight. The solvent was evaporated from the reacted liquid to provide the polyurethane acrylate resin shown in Table 1.

Synthesis of Electron Beam Curing Type Polyurethane Acrylate Used in Examples 1 to 18

Dimethyl terephthalate, dimethyl isophthalate, 5-dimethyl sodium sulfoisophthalate, ethylene glycol, neopentyl glycol and tetrabutoxy titanate were introduced into an autoclave equipped with a thermometer, an agitator and a partial reflux condenser, heated at 150 to 230° C. for 120 minutes to be transesterificated, and further reacted at 220 to 230° C. for 1 hour. Then, the reaction system was heated to 250° C. for 30 minutes, and the pressure in the system was gradually decreased to 10 mmHg (1333 Pa) after 45 minutes. The reaction was continued for 60 minutes under the conditions. The resultant polyester diol (D1) had a molar ratio of terephthalic acid/isophtalic acid/5-sodium sulfoisophthalate/ethylene glycol/neopentyl glycol=49/49/2/50/50.

By repeating the similar procedure, polyester diol (D2) having a molar ratio of adipic acid/1,4-butanediol/neopentyl glycol=100/75/25 was provided.

Toluene, methylethylketone, the polyester diol (D1), the polyester diol (D2), 4,4'-diphenylmethanediisocyanate 3-diethylamino-1,2-propane diol and dibutyl tin laurate were introduced into a reaction vessel equipped with a thermometer, an agitator and a reflux condenser, reacted at 70 to 80° C. for 3 hours. Then, pentaerythritol acrylate was added and reacted at 70 to 80° C. for 2 hours to provide a polyurethane acrylate resin solution having a solid content of 40% by weight. The solvent was evaporated from the reacted liquid to provide the polyurethane acrylate resin (Example 3) shown in Table 1.

The electron beam curing type polyurethane acrylate resins used in Examples 1, 2, 4 to 18 were synthesized by changing blending ratios of various raw materials.

Each of the above-mentioned electron beam curing type polyurethane acrylate resin was used to produce a magnetic tape.

<Preparation of Coating Agent for Top Magnetic Layer>
Preparation of Binder Solution

|  | parts by weight |
|---|---|
| Vinyl chloride resin | 10 |
| ("MR-110" made by Nippon Zeon Co., Ltd.) |  |
| Polyester polyurethane resin | 7 |
| ("UR-8300" made by Toyobo Co., Ltd.) |  |
| MEK (methyl ethyl ketone) | 21 |
| Toluene | 21 |
| Cyclohexane | 21 |

The above materials were introduced into a hyper mixer, mixed and agitated to prepare a binder solution.

Kneading

The following materials were introduced into a pressure kneader, and were blended for 2 hours.

|  | parts by weight |
|---|---|
| α-Fe magnetic powder<br>(Hc = 18000 Oe (143.2 kA/m), σs = 130 emu/g<br>(130 Am$^2$/kg), BET specific surface area = 60 m$^2$/g,<br>average major axis length = 0.10 μm) | 100 |

-continued

| | parts by weight |
|---|---|
| α-Al$_2$O$_3$ ("HIT-82" made by Sumitomo Chemical Co., Ltd., average particle size = 0.13 μm) | 12 |
| Prepared binder solution | 40 |

Into the resultant slurry, the following materials were introduced to adjust optimum viscosity for a dispersing treatment.

| | parts by weight |
|---|---|
| Prepared binder solution | 40 |
| MEK | 15 |
| Toluene | 15 |
| Cyclohexane | 15 |

Dispersing Treatment

The resultant slurry was subjected to a dispersing treatment.

Viscosity Controlling Liquid

The following materials were introduce into a hyper mixer, were mixed and agitated for 1 hour to provide a viscosity controlling liquid. The viscosity controlling liquid is circulated and filtrated using a 1.2 μm depth filter with a 95% cut filtration accuracy.

| | parts by weight |
|---|---|
| Stearic acid | 0.5 |
| Myristic acid | 0.5 |
| Butyl stearate | 0.5 |
| MEK | 200 |
| Toluene | 200 |
| Cyclohexanone | 200 |

Viscosity Control

The viscosity controlling liquid was mixed with a slurry dispersed and agitated, and was then dispersed using a sand mill to provide a coating agent. The coating agent was circulated and filtrated using a 1.2 μm depth filter with a 95% cut filtration accuracy.

Final Coating 0.8 parts by weight of an isocyanate compound ("CORONATE L" made by Nippon Polyurethane Industry Co., Ltd.) was added to 100 parts by weight of the filtrated coating agent, agitated and mixed. The mixture was circulated and filtrated using a 1.2 μm depth filter with a 95% cut filtration accuracy to provide a final coating agent for the magnetic layer.

<Preparation of Coating Agent for Non-Magnetic Under Layer>

Preparation of Binder Solution

| | parts by weight |
|---|---|
| Electron beam curing type vinyl chloride resin (polymerization degree 300, polar group: —OSO$_3$K = 1.5/molecule) | 10 |
| Electron beam curing type polyurethane acrylate resin shown in Tables 1 to 3 | 7 |

-continued

| | parts by weight |
|---|---|
| MEK | 21 |
| Toluene | 21 |
| Cyclohexane | 21 |

The above materials were introduced into a hyper mixer, mixed and agitated to prepare a binder solution.

Kneading

The following materials were introduced into a pressure kneader, and were blended for 2 hours.

| | parts by weight |
|---|---|
| Needle-like α-Fe$_2$O$_3$ ("DBN-455BX" made by Toda Kogyo Corporation, average major axis length = 0.11 μm, BET specific surface area = 55 m$^2$/g) | 70 |
| Carbon black ("#950B" made by Mitsubishi Chemical Corporation, average particle size = 16 nm, BET specific surface area = 260 m$^2$/g, DEP oil absorption: 79 ml/100 g, pH = 7.5) | 15 |
| Prepared binder solution | 40 |

Into the resultant slurry, the following materials were introduced to adjust optimum viscosity for a dispersing treatment.

| | parts by weight |
|---|---|
| Prepared binder solution | 40 |
| MEK | 30 |
| Toluene | 30 |
| Cyclohexane | 30 |

Dispersing Treatment

The resultant slurry was subjected to a dispersing treatment using a sand mill.

Viscosity Controlling Liquid

The following materials were introduced into a hyper mixer, were mixed and agitated to provide a viscosity controlling liquid.

| | parts by weight |
|---|---|
| Stearic acid | 0.5 |
| Myristic acid | 0.5 |
| Butyl stearate | 0.5 |
| MEK | 55 |
| Toluene | 55 |
| Cyclohexanone | 55 |

Viscosity Control and Final Coating Agent

The viscosity controlling liquid was mixed with a slurry dispersed and agitated, and was then again dispersed using the sand mill to provide a coating agent. The coating agent was circulated and filtrated using a 1.2 μm depth filter with a 95% cut filtration accuracy to provide a final coating agent for the non-magnetic layer.

<Preparation of Coating Agent for Back Coat Layer>
Preparation of Binder Solution

|  | parts by weight |
| --- | --- |
| Vinyl chloride - vinyl acetate - vinyl alcohol copolymer (monomer weight ratio = 92:3:5, average polymerization degree = 420) | 65 |
| Polyester polyurethane resin ("UR-8300" made by Toyobo Co., Ltd.) | 35 |
| MEK | 260 |
| Toluene | 260 |
| Cyclohexane | 260 |

The above materials were introduced into a hyper mixer, mixed and agitated to prepare a binder solution.

Dispersing Treatment

The following compositions were introduced into a ball mill, and dispersed for 24 hours.

|  | parts by weight |
| --- | --- |
| Carbon black ("Conductex SC" made by Columbian Carbon Japan, Ltd., average particle size = 20 nm, BET specific surface area = 220 m²/g) | 80 |
| Carbon black ("Sevacarb MT" made by Columbian Carbon Japan, Ltd., average particle size = 350 nm, BET specific surface area = 8 m²/g) | 1 |
| $\alpha$-$Fe_2O_3$ ("TF100" made by Toda Kogyo Corporation, average particle size = 0.1 $\mu$m) | 1 |
| Prepared binder solution | 880 |

Viscosity-Controlling Solution

The following materials were introduced into a hyper mixer, were agitated to provide a viscosity controlling liquid.

|  | parts by weight |
| --- | --- |
| Stearic acid | 1 |
| Myristic acid | 1 |
| Butyl stearate | 2 |
| MEK | 210 |
| Toluene | 210 |
| Cyclohexanone | 210 |

Viscosity Control

The viscosity controlling liquid was mixed with a slurry dispersed and agitated, and was then again dispersed using the ball mill to provide a coating agent. The coating agent was circulated and filtrated using a 1.2 $\mu$m depth filter with a 95% cut filtration accuracy.

Final Coating 1 parts by weight of an isocyanate compound ("CORONATE L" made by Nippon Polyurethane Industry Co., Ltd.) was added to 100 parts by weight of the filtrated coating agent, agitated and mixed. The mixture was circulated and filtrated using a 1.2 $\mu$m depth filter with a 954 cut filtration accuracy to provide a final coating agent for the back coat layer.

<Preparation of Magnetic Tape>

A magnetic tape in each Example and Comparative Example was prepared as follows:

Properties of the electron beam curing type polyurethane acrylate resins used in the magnetic tapes Examples 1 to 18 and Comparative Examples 1 to 3 are shown in Tables 1 to 3.

The above-mentioned coating agent for the non-magnetic under layer was coated on the non-magnetic substrate (polyethylene terephthalate film having a thickness of 8.3 $\mu$m), dried, irradiated with electron beams (5 Mrad) under nitrogen gas atmosphere, and cured. The coating agent for the magnetic top layer is coated on the non-magnetic under layer, oriented and dried. The coating agent for the back coat layer is coated on a rear surface of the non-magnetic substrate. After drying, calendering was performed. After calendering, the magnetic top layer had a thickness of 0.2 $\mu$m, the non-magnetic under layer had a thickness of 1.8 $\mu$m. and the back coat layer had a thickness of 0.5 $\mu$m for all samples.

Thus-obtained each roll was allowed to stand for 24 hours at room temperature, and cured in an oven at 60° C. for 24 hours. Then, the roll was cut to 8 mm wide, and incorporated into a cassette to provide each magnetic tape sample.

Each resultant magnetic tape sample was evaluated as follows:

<Surface Roughness Ra>

Surface roughness was measured using a stylus surface shape measuring device, "TALYSTEP system" made by Taylor Hobson's Co., Ltd. in accordance with a method described in JIS B-0601. Measuring conditions were as follows:

Filter condition: 0.18 to 9 Hz
Stylus pressure: 2 mg
Needle used: 0.1×2.5 $\mu$m special stylus
Scanning speed: 0.03 mm/sec
Scanning length: 500 $\mu$m Ra was determined based on the results.

In Tables, the non-magnetic layer Ra refers to surface roughness of the non-magnetic layer after the coating agent for the non-magnetic layer was coated, dried and irradiated with electron beams. The magnetic layer Ra refers to surface roughness of the magnetic layer after final calendering and curing were performed.

<Y-S/N>

50% level video signals were recorded and read on the magnetic tape sample at a standard level, and a relative value of S/N was determined using a noise meter 925D made by Shibasoku KK such that Y-S/N of Comparative Example 1 was set to 0 dB. A deck used was EVS-900 (Hi8 format VTR) made by Sony Corporation.

<C-S/N>

Normal level color video signals including 50% level video signals, on which chroma signals were overlaid, were recorded and read on the magnetic tape sample at a standard level, and a relative value of S/N (AM components) was determined using a noise meter 925D made by Shibasoku KK such that C-S/N of Comparative Example 1 was set to 0 dB. A deck used was EVS-900 (Hi8 format VTR) made by Sony Corporation.

<Running Durability>

50 tape samples were run within a VTR 100 times at 0° C. and 40° C. under 80% RH, running troubles such as running stop and head clogging were evaluated as follows:

Excellent: no trouble

Good: one tape sample was troubled

A deck used was EVS-900 (Hi8 format VTR) made by Sony Corporation.

The results are also shown in Tables 1 to 3.

TABLE 1

|  |  | Comp. Ex. 1 | Comp. Ex. 2 | Comp. Ex. 3 | Ex. 1 | Ex. 2 | Ex. 3 | Ex. 4 |
|---|---|---|---|---|---|---|---|---|
| Electronic beam curing type polyurethane acrylat resin | Polar group 1 | none | —$SO_3Na$ | none | —$SO_3Na$ | —$SO_3Na$ | —$SO_3Na$ | —$SO_3Na$ |
|  | Conc. of polar group 1 (mmol/g) | 0 | 0.1 | 0 | 0.1 | 0.1 | 0.1 | 0.1 |
|  | Polar group 2 | none | none | —$N(C_2H_5)_2$ | —$N(C_2H_5)_2$ | —$N(C_2H_5)_2$ | —$N(C_2H_6)_2$ | —$N(C_2H_6)_2$ |
|  | Conc. of polar group 2 (mmol/g) | 0 | 0 | 0.1 | 0.1 | 0.1 | 0.1 | 0.1 |
|  | Number average molecular weight | 20000 | 20000 | 20000 | 5000 | 10000 | 20000 | 50000 |
|  | Tg (° C.) | 20 | 20 | 20 | 20 | 20 | 20 | 20 |
| Evaluation | Non-magnetic layer Ra (nm) | 15.0 | 11.0 | 13.0 | 6.5 | 7.5 | 8.0 | 8.3 |
|  | Magnetic layer Ra (nm) | 8.0 | 6.5 | 7.0 | 2.5 | 2.8 | 3.0 | 3.5 |
|  | Y-S/N (dB) | 0.0 | +1.0 | +0.8 | +2.8 | +2.7 | +2.5 | +2.3 |
|  | C-S/N (dB) | 0.0 | +1.2 | +1.0 | +2.9 | +2.6 | +2.5 | +2.2 |
|  | Running Durability 0° C. | excellent | excellent | excellent | excellent | excellent | excellent | excellent |
|  | 40° C. | excellent | excellent | excellent | good | excellent | excellent | excellent |
|  | 80% RH |  |  |  |  |  |  |  |

TABLE 2

|  |  | Ex. 5 | Ex. 6 | Ex. 7 | Ex. 8 | Ex. 9 | Ex. 10 | Ex. 11 |
|---|---|---|---|---|---|---|---|---|
| Electronic beam curing type polyurethane acylate resin | Polar group 1 | —$SO_3Na$ | —$SO_3Na$ | —$SO_3Na$ | —$SO_3Na$ | —$SO_3Na$ | —$SO_3Na$ | —$SO_3Na$ |
|  | Conc. of polar group 1 (mmol/g) | 0.1 | 0.1 | 0.1 | 0.1 | 0.1 | 0.1 | 0.1 |
|  | Polar group 2 | —$N(C_2H_5)_2$ | —$N(C_2H_5)_2$ | —$N(C_2H_5)_2$ | —$N(C_2H_5)_2$ | —$N(C_2H_5)_2$ | —$N(C_2H_5)_2$ | —$N(C_2H_5)_2$ |
|  | Conc. of polar group 2 (mmol/g) | 0.1 | 0.1 | 0.1 | 0.1 | 0.1 | 0.1 | 0.1 |
|  | Number average molecular weight | 100000 | 20000 | 20000 | 20000 | 20000 | 20000 | 20000 |
|  | Tg (° C.) | 20 | −20 | 0 | 40 | 60 | 80 | 20 |
| Evaluation | Non-magnetic layer Ra (nm) | 9.0 | 8.1 | 8.2 | 7.9 | 8.0 | 8.2 | 8.5 |
|  | Magnetic layer Ra (nm) | 4.0 | 2.5 | 2.7 | 3.3 | 3.5 | 3.7 | 3.4 |
|  | Y-S/N (dB) | +2.0 | +3.0 | +2.7 | +2.4 | +2.4 | +2.2 | +2.3 |
|  | C-S/N (dB) | +2.1 | +2.9 | +2.8 | +2.4 | +2.2 | +2.1 | +2.2 |
|  | Running durabillity 0° C. | excellent | excellent | excellent | excellent | excellent | good | excellent |
|  | 40° C. | excellent | good | excellent | excellent | excellent | excellent | excellent |
|  | 80% RH |  |  |  |  |  |  |  |

TABLE 3

|  |  | Ex. 12 | Ex. 13 | Ex. 14 | Ex. 15 | Ex. 16 | Ex. 17 | Ex. 18 |
|---|---|---|---|---|---|---|---|---|
| Electronic beam curing type polyurethane acrylate resin | Polar group 1 | —$SO_3Na$ | —$SO_3Na$ | —$SO_3Na$ | —$SO_3Na$ | —$SO_3Na$ | —$SO_3Na$ | —$SO_3Na$ |
|  | Conc. of polar group 1 (mmol/g) | 0.05 | 0.2 | 0.5 | 0.1 | 0.1 | 0.1 | 0.1 |
|  | Polar group 2 | —$N(C_2H_5)_2$ | —$N(C_2H_5)_2$ | —$N(C_2H_5)_2$ | —$N(C_2H_5)_2$ | —$N(C_2H_5)_2$ | —$N(C_2H_5)_2$ | —$N(C_2H_5)_2$ |
|  | Conc. of polar group 2 (mmol/g) | 0.1 | 0.1 | 0.1 | 0.01 | 0.05 | 0.2 | 0.5 |
|  | Number average molecular weight | 20000 | 20000 | 20000 | 20000 | 20000 | 20000 | 20000 |
|  | Tg (° C.) | 20 | 20 | 20 | 20 | 20 | 20 | 20 |
| Evaluation | Non-magnetic layer Ra (nm) | 8.3 | 7.8 | 7.7 | 8.4 | 8.2 | 8.0 | 7.9 |
|  | Magnetic layer Ra (nm) | 3.1 | 2.8 | 2.8 | 3.3 | 3.1 | 2.9 | 2.9 |
|  | Y-S/N (dB) | +2.5 | +2.7 | +2.6 | +2.3 | +2.5 | +2.9 | +2.8 |
|  | C-S/N (dB) | +2.4 | +2.7 | +2.5 | +2.4 | +2.4 | +2.5 | +2.6 |
|  | Running durability 0° C. | excellent | excellent | excellent | excellent | excellent | excellent | excellent |
|  | 40° C. | excellent | excellent | excellent | excellent | excellent | excellent | excellent |
|  | 80% RH |  |  |  |  |  |  |  |

What is claimed is:

1. A magnetic recording medium, comprising:
   a non-magnetic substrate,
   a non-magnetic layer disposed on the non-magnetic substrate, and
   a magnetic layer disposed on the non-magnetic substrate via the non-magnetic layer containing at least carbon black and a radiation curing binder,
   wherein the radiation curing binder contains a radiation curing polyurethane resin having both a basic polar group and a sulfur-containing polar group in a molecule.

2. A magnetic recording medium according to claim 1, wherein the basic polar group is an amino group.

3. A magnetic recording medium according to claim 1, wherein the sulfur-containing polar group is a sulfonic metal basic group.

4. A magnetic recording medium according to claim 1, wherein the radiation curing polyurethane resin has a glass transition temperature of −20° C. to 80° C.

5. A magnetic recording medium according to claim 1, wherein the radiation curing polyurethane resin has a number average molecular weight of 5000 to 100000.

* * * * *